(12) United States Patent
Lasich

(10) Patent No.: US 7,109,461 B2
(45) Date of Patent: Sep. 19, 2006

(54) SOLAR TRACKING SYSTEM

(75) Inventor: John Beavis Lasich, Deepdene (AU)

(73) Assignee: Solar Systems Pty Ltd., Hawthorn (AU)

( * ) Notice: Subject to any disclaimer, the term of this patent is extended or adjusted under 35 U.S.C. 154(b) by 0 days.

(21) Appl. No.: 10/472,978

(22) PCT Filed: Mar. 28, 2002

(86) PCT No.: PCT/AU02/00404

§ 371 (c)(1),
(2), (4) Date: Sep. 26, 2003

(87) PCT Pub. No.: WO02/079793

PCT Pub. Date: Oct. 10, 2002

(65) Prior Publication Data

US 2004/0079863 A1    Apr. 29, 2004

(30) Foreign Application Priority Data

Mar. 28, 2001 (AU) .................... PR4039

(51) Int. Cl.
*G01J 1/20* (2006.01)
*G01C 21/24* (2006.01)
*G01C 21/02* (2006.01)

(52) U.S. Cl. .......... 250/203.4; 126/578; 136/246
(58) Field of Classification Search ........... 250/203.4; 126/573–608; 136/246, 259, 206; 244/171
See application file for complete search history.

(56) References Cited

U.S. PATENT DOCUMENTS

| | | | |
|---|---|---|---|
| 4,187,123 A | | 2/1980 | Diggs |
| 4,215,410 A | * | 7/1980 | Weslow et al. ............ 700/61 |
| 4,225,781 A | * | 9/1980 | Hammons ............... 250/203.4 |
| 4,332,238 A | * | 6/1982 | Garcia, Jr. ............... 126/578 |
| 4,355,896 A | * | 10/1982 | Frosch et al. ............ 356/222 |
| 4,395,581 A | * | 7/1983 | Girard ..................... 359/853 |
| 4,465,734 A | | 8/1984 | Laroche et al. |
| 4,491,681 A | | 1/1985 | Kirpich |
| 4,807,969 A | | 2/1989 | Shimodaira et al. |
| 5,531,215 A | * | 7/1996 | Schwarz ................... 126/578 |
| 6,043,778 A | * | 3/2000 | Froeberg et al. ...... 342/357.14 |
| 6,465,766 B1 | * | 10/2002 | Zhang ................... 250/203.4 |

FOREIGN PATENT DOCUMENTS

AU    A 81973/87    6/1989

(Continued)

OTHER PUBLICATIONS

International Preliminary Examination Report of PCT Application No. PCT/AU02/00402.

*Primary Examiner*—Stephone B. Allen
*Assistant Examiner*—Suezu Ellis
(74) *Attorney, Agent, or Firm*—Klarquist Sparkman, LLP

(57) ABSTRACT

The invention provides a solar tracking system for controlling the alignment of an instrument with respect to the sun, the instrument having a solar radiation receiver and a solar radiation collector for collecting solar radiation and directing the radiation towards the receiver, the system having: at least first and second detectors locatable so as to move with the receiver and receive radiation from the collector, for generating respective first and second output signals according to their respective exposure to solar radiation from the collector; a comparison means for comparing the first and second outputs and producing a comparison signal indicative thereof; and control means for controlling the alignment of the instrument according to the comparison signal.

12 Claims, 4 Drawing Sheets

FOREIGN PATENT DOCUMENTS

| | | |
|---|---|---|
| DE | 2945908 | 5/1981 |
| DE | 3612325 A1 | 10/1986 |
| DE | 4116894 A1 | 11/1992 |
| DE | 4326845 A1 | 2/1994 |
| EP | 0464738 B1 | 1/1992 |
| EP | 0 789405 A2 | 8/1997 |
| EP | 1126529 A2 | 8/2001 |
| FR | 2566183 | 12/1985 |
| JP | 10062017 A | 3/1988 |
| WO | WO 95/02199 | 1/1995 |
| WO | WO 97/57493 | 11/1999 |
| WO | WO 00/66947 | 11/2000 |
| WO | WO 02/078933 A1 | 10/2002 |
| WO | WO 02/080286 A1 | 10/2002 |

* cited by examiner

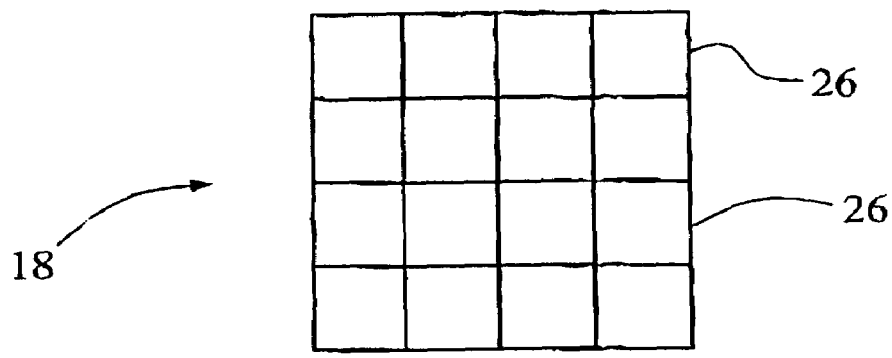
Figure 3
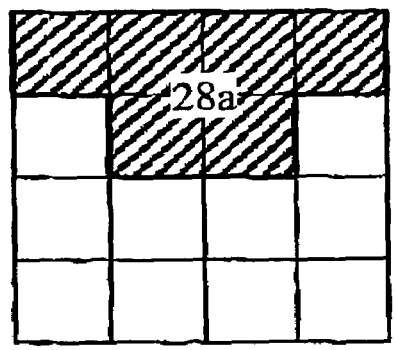 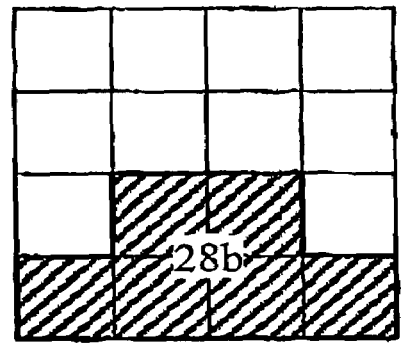
Figure 4A  Figure 4B
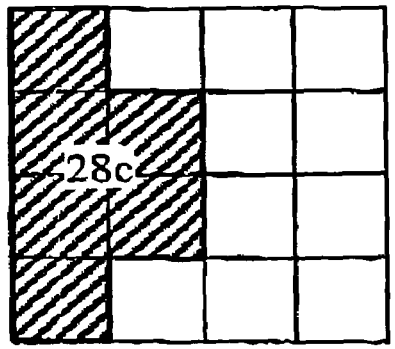 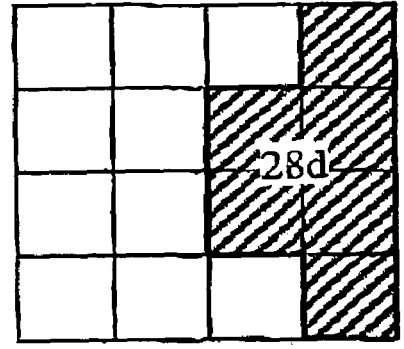
Figure 4C  Figure 4D

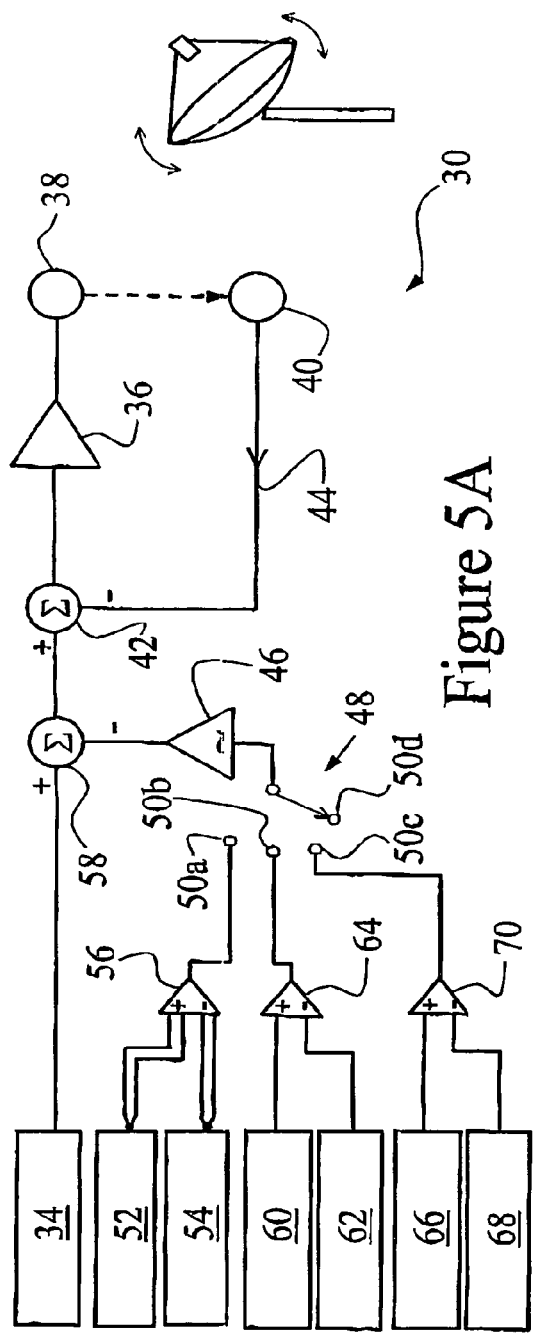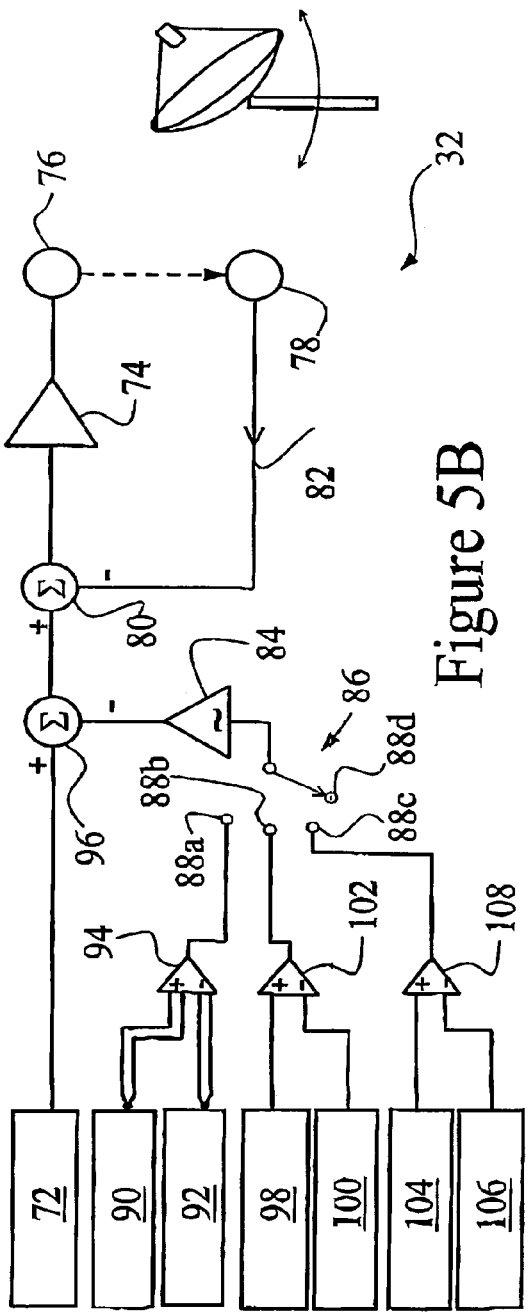
Figure 5A
Figure 5B

SOLAR TRACKING SYSTEM

CROSS REFERENCE TO RELATED APPLICATIONS

This is the National Stage of International Application No. PCT/AU0200404, filed Mar. 28, 2002, and claims the benefit of Australian Patent Application No. PR4039, filed Mar. 28, 2001.

FIELD OF THE INVENTION

The present invention relates to a system and method for tracking the sun, of particular but by no means exclusive application in telescopes and solar power collectors.

BACKGROUND OF THE INVENTION

Existing techniques for tracking the sun rely typically on one or more of three methods. The diurnal motion of the sun is well understood, and consequently a telescope, for example, can be mounted on an accurately aligned alt-azimuth or equatorial mount. The axial drives of that mount are then computer controlled to maintain the telescope in an orientation that will point the objective lens or mirror of the telescope at the sun's calculated position.

This approach, however, requires the highly accurate initial alignment of the mount. This may be practical in a fixed instrument such as research telescope, where the accurate alignment of the mount is one facet of an overall extensive ad precise installation procedure conducted by expert scientists and engineers, of lengthy duration and considerable expense. Such installation time and expense may not be acceptable in other applications, such as the installation of solar power collectors on a mass scale.

A less accurate and cheaper alternative is to control the axial drives on the assumption that the sun follows the ecliptic (or even celestial equator) in an entirely regular manner, thug ignoring the effects of the equation of time and—where the sun is assumed to follow the celestial equator—the effects of the earth's axial tilt.

Another existing approach is so-called shadow bar sun sensing, in which a pair of sensors are mounted on a solar radiation collector (such as a dish or plane mirror) between a shadow bar. The shadow bar casts a shadow on one of the sensors if the collector is not pointing directly at the sun. The collector's attitude can then be adjusted on the basis of the outputs of these sensors until those outputs are equal.

These existing approaches, however, make no allowance for the subsequent effects of imperfect manufacturing tolerances on the orientation of the radiation receiver (to which the collector directs collected radiation) relative to the collector itself. The effect of such imperfections will also vary with the changing position of the sun and orientation of the collector, even if the receiver is fixed with respect to the collector. In fact the receiver may also shift slightly relative to the collector, owing to sagging in the receiver supports (which would commonly be used to hold the receiver at the focus of the collector), or to variations in the overall structure due to temperature fluctuations and the like.

For many applications these shortcomings may be acceptable, or at least tolerable, especially in systems where maximizing the collection of solar radiation is less sensitive to tracking precision. This may be the case in systems that do not concentrate the solar flux by means of, for example, a spherical or parabolic mirror. If a plane mirror is used, errors in tracking precision of even 5° may not excessively reduce collection efficiency. Indeed, many solar hot water heaters (typically with flat collection panels) perform no solar tracking whatsoever, so existing approaches—which provide at least some tracking—will clearly be of use in some applications. However, where the solar flux is concentrated (possibly by a factor of as much as three or more), a 5° tracking error may produce unacceptably high looses in collection efficiency.

SUMMARY OF THE INVENTION

The present invention provides, therefore, a solar tracking system for controlling the alignment of an instrument with respect to the sun, said instrument having a solar radiation receiver and a solar radiation collector for collecting solar radiation and directing said radiation towards said receiver, said system comprising:

at least first and second detectors locatable so as to move with said receiver and receive radiation from said collector, for generating respective first and second output signals according to their respective exposure to solar radiation from said collector;

a comparison means for comparing said first and second output signals and producing a comparison signal indicative thereof; and control means for controlling said alignment of said instrument according to said comparison signal;

wherein said detectors are a part of said receiver.

Thus, the detectors are exposed to solar radiation directed to them by the collector; it will be understood, however, that the collector could optionally include auxiliary mirrors provided to direct solar radiation towards the detectors (rather than the receiver).

Preferably said system includes at least first and second solar radiation sensors locatable so as to move with said collector and receive radiation from the sun, for generating respective first and second sensor output signals according to their respective exposure to solar radiation from the sun;

a further comparison means for comparing said first and second sensor outputs and producing a sensor comparison signal indicative thereof; and a further control means operable to employ said sensor comparison signal in controlling said alignment of said instrument.

Thus, a coarse level of tracking may be provided by sensing sun at the collector, with a finer level of tracking provided by means of the detectors associated with the receiver. Although separate, further comparison and control means may be employed for this coarser tracking, in one embodiment the further comparison means and the further control means are provided by the comparison means and the control means respectively. Also, the first and second sensors may be provided in the form of shadow bar sun sensors.

Preferably said detectors are photodetectors and said first and second output signals comprise signals indicative of said solar radiation falling on said respective first and second detectors. More preferably each of said photodetectors comprises one or more photovoltaic cells, wherein said first and second output signals respectively comprise the current outputs of said respective first and second detectors, or the voltages across said respective first and second detectors.

Alternatively, said detectors are thermal detectors and said first and second output signals comprise signals indicative of the heating of said respective first and second detectors when exposed to said solar radiation.

The detectors may form a part of said instrument. More preferably said detectors are a part of said receiver.

Thus, the system could employ the signals from photo-detectors or temperature sensors (or from both), both of which will generally be sensitive to solar light flux. Consequently, the instrument—or its mount—need not be aligned with the great precision required by other approaches, as the system aligns the instrument according to the actual position of the sun, thereby correcting for misalignment in the mounting of the instrument or receiver.

Preferably said comparison means is operable to control said alignment to maximize the sum of said first and second output signals.

Preferably said system includes at least one shadow means for casting a shadow onto said respective first and second detectors, wherein in use the area of said shadow on each detector depends on the alignment of said instrument so that said first and second outputs are more highly sensitive to misalignment of said detectors with respect to said solar radiation.

Thus, if the detectors are located, say, either side of a shadow means, or each is provided with a plurality of side walls located to cast a shadow on that detector if misalignment occurs, at least one of the detector's outputs will drop with angle of misalignment $\theta$ much faster than by merely $\cos \theta$ (in the example of a plane detector approximately perpendicular to the direction of the sun), thereby making the system more sensitive to misalignment.

Preferably said system includes a solar position predictor, for predicting the position of the sun on the basis of either a look-up table of solar positions or a solar position algorithm, and said control means is operable to employ said predicted position in controlling said alignment of said instrument.

Thus, the coarse position of the instrument with respect to the sun can be determined on the basis of, for example, a suitable almanac, equation (s) for the evolving altitude and azimuth (or right ascension and declination) of the sun, or the like.

Preferably said control mean is operable to control said alignment so as to protect said instrument from overheating if any one or more of said first output, said second output or said comparison indicates that said instrument is, or is in danger of, overheating.

Preferably said system includes four detectors, each of which comprises a grid of detector elements.

Thus, detector elements within the receiver can act as the detectors.

Preferably said system is operable to control said alignment to maximize an output of said instrument. In one embodiment, said instrument is a solar power collector having photovoltaic cells for converting solar radiation flux into electric current, and said system is operable to control said alignment to maximize said electric current of said instrument. More preferably at least some of said photovoltaic cells constitute said detectors.

For example, a first group of said photovoltaic cells may constitute said first detector, while a second group of said photovoltaic cells may constitute said second detector.

The present invention also provides a method of solar tracking for controlling the alignment of an instrument with respect to the sun, said instrument having a solar radiation receiver and a solar radiation collector for collecting solar radiation and directing said radiation towards said receiver, said method comprising:

locating at least first and second detectors so as to move with said receiver and receive radiation from said collector, to generate therefrom respective first and second output signals according to their respective exposure to solar radiation from said collector;

comparing said first and second outputs and producing a comparison signal indicative thereof; and controlling said alignment of said instrument according to said comparison;

wherein said detectors are a part of said receiver.

Preferably said method includes locating at least first and second solar radiation sensors so as to move with said collector and receive radiation from the sun, for generating respective first and second sensor output signals according to their respective exposure to solar radiation from the sun;

comparing said first and second sensor outputs and producing a sensor comparison signal indicative thereof; and employing said sensor comparison in controlling said alignment of said instrument.

Preferably said method includes predicting the position of the sun on the basis of either a look-up table of solar positions or a solar position algorithm, and employing said predicted position in controlling said alignment of said instrument.

Preferably said method includes controlling said alignment so as to protect said instrument from overheating if any one or more of said first output, said second output or said comparison indicates that said instrument or a part thereof is, or is in danger of, overheating.

Preferably said method includes providing said detectors as a part of said receiver.

Preferably said method includes employing four detectors, each of which comprises a grid of detector elements.

Preferably said method includes controlling said alignment to maximize an output of said instrument.

The present invention still further provides a solar tracking system for controlling the alignment of a solar radiation receiver with respect to the sun, comprising:

at least first and second detectors forming a part of said receiver and receiving a portion of said solar radiation, for generating respective first and second output signals according to their respective exposure to solar radiation;

a comparison means for comparing said first and second outputs and producing a comparison signal indicative thereof; and control means for controlling said alignment of said receiver according to said comparison signal;

whereby said detectors can function both to receive solar radiation as a part of said receiver and in controlling said alignment of said receiver.

BRIEF DESCRIPTION OF THE DRAWINGS

In order that the present invention may be more clearly ascertained, an embodiment will now be described, by way of example, with reference to the accompanying drawing, in which:

FIG. 3 is a schematic representation of the array of photovoltaic cells of FIG. 2;

FIGS. 4A to 4D are views of respectively four subsets of photovoltaic cells of the array of FIG. 3; and FIGS. 5A and 5B are schematic diagrams of the elevation axis controller and azimuth axis controller respectively of the tracking system of FIG. 1.

DETAILED DESCRIPTION OF THE INVENTION

Figure 1:
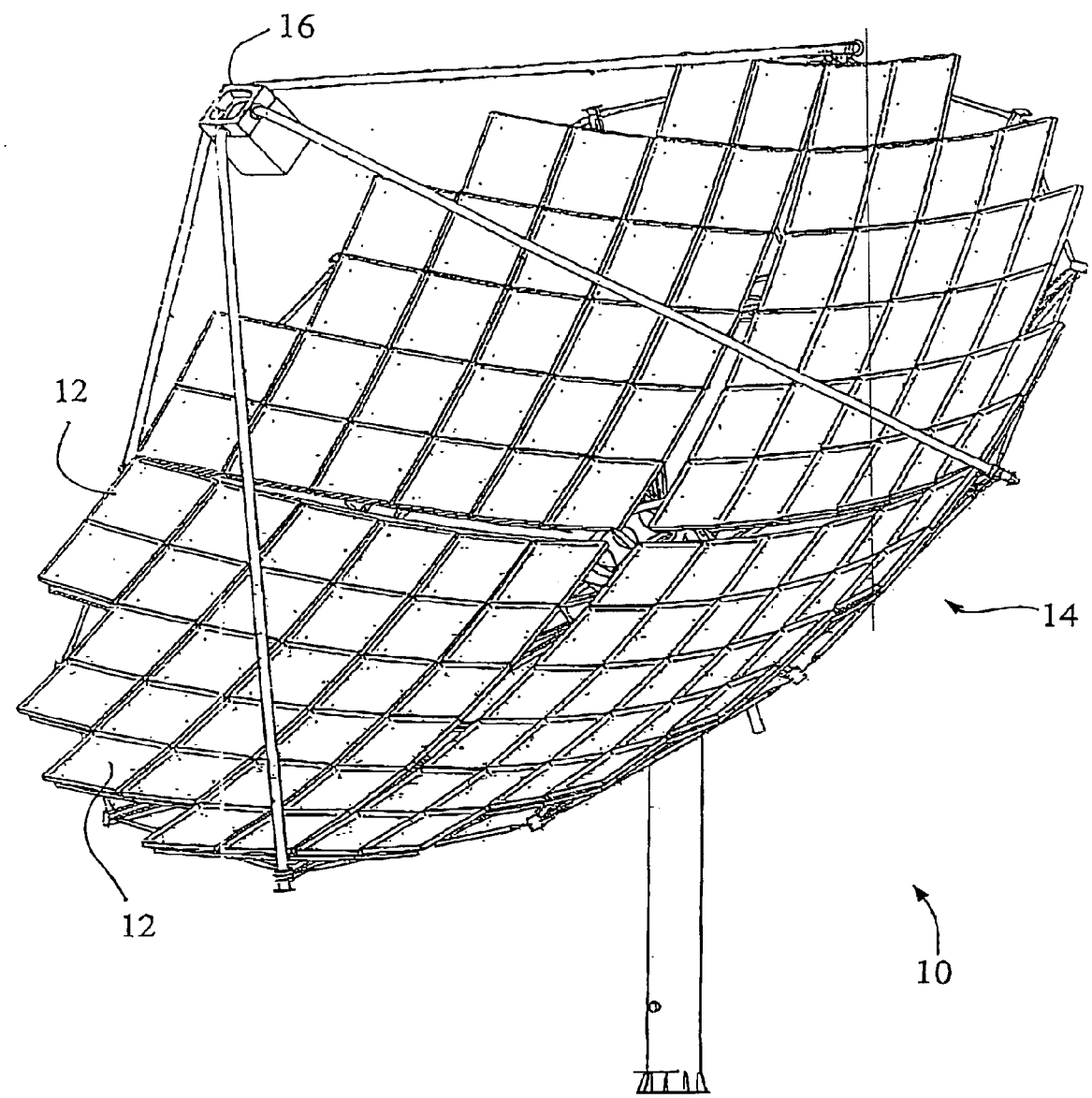
FIG. 1 is a view of a solar electric power generator of the type to be controlled by a solar tracking control system according to one embodiment of the present invention.

A solar electric power generator of a type for controlling by means of a solar tracking control system according to an embodiment of the present invention is illustrated schematically at 10 in FIG. 1. The generator 10 includes an array of focussing mirrors 12 forming a dish 14, and a receiver 16 substantially at the focus of the dish 14. The receiver 16 includes an array of photovoltaic cells (see FIG. 2). The solar tracking control system is principally intended to maximize the power output of the generator 10. It should be noted, as will be understood by those in the art, that the optimal alignment in such an application may not be directly at the sun. Asymmetries in or misalignment of the dish 14 and receiver 16 of the solar electric power generator may mean that the greatest power output is achieved with an alignment that, by conventional measures, is not directly—or apparently directly—at the sun.

Figure 2:
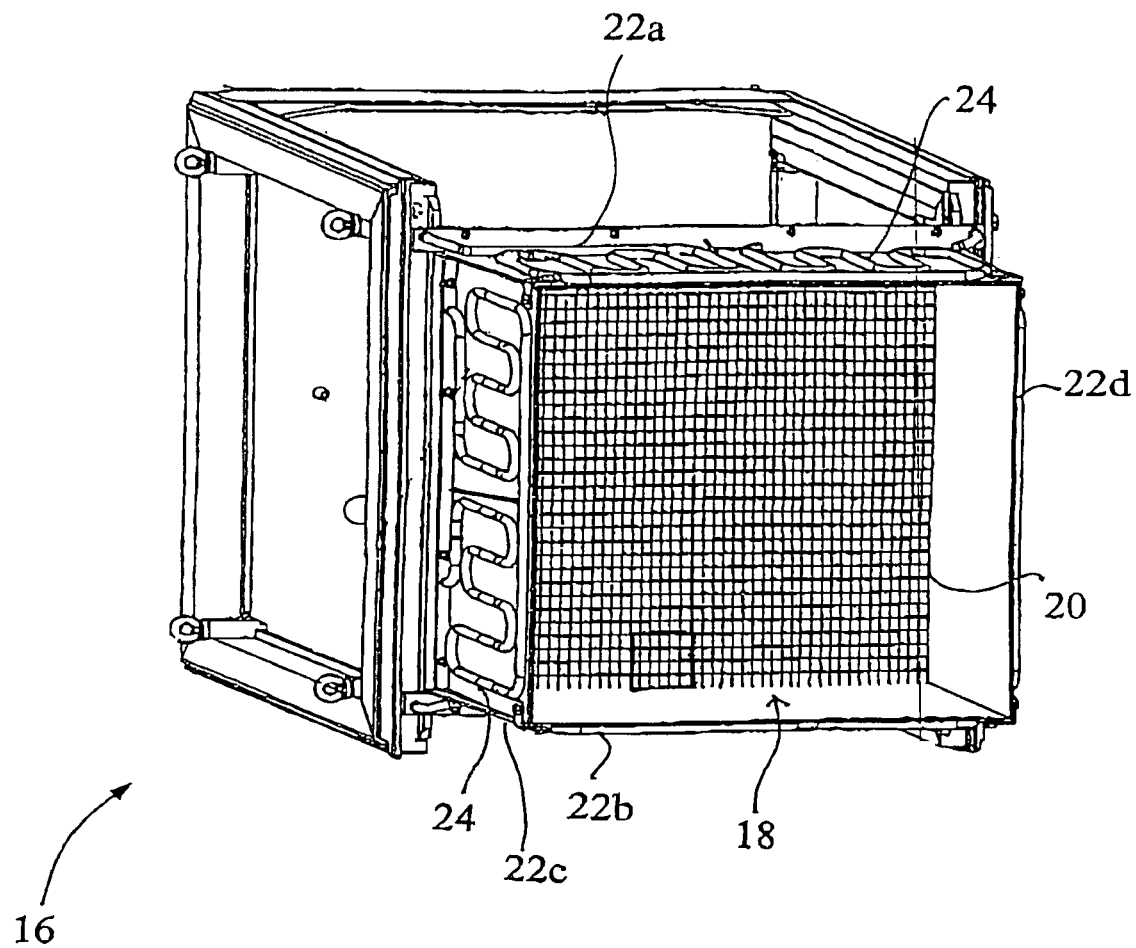
FIG. 2 in a view of the array of photovoltaic cells and flux modifier plates of the solar electric power generator of FIG. 1.

Referring to FIG. 2, the receiver 16 comprises a square array 18 of photovoltaic cells 20. In addition, the receiver 16 is equipped with four reflective flux modifier plates 22a,b,c,d surrounding the array 18, to reflect some of the solar flux (that would otherwise miss the array 18) onto the photovoltaic cells 20.

The four flux modifier plates 22a,b,c,d are cooled by means of coolant tubes 24.

The tracking system uses a combination of open loop and closed loop control to position the dish 14 and therefore receiver 16 in a manner that will achieve maximum electrical power output and safe operating conditions. The system's axial controllers account for mechanical and optical variations that arise out of such manufacturing non-conformity and/or operational effects.

The axial controllers of the system (discussed in greater detail below) continuously compute the position of the sun (both elevation and azimuth) in space. The resultant values of solar elevation and azimuth are translated into revolutions of the mechanical movement appropriate for the positioning system of the dish 14 and receiver 16, thereby aligning the dish 14 approximately to the sun (typically to within about ±1°), but without accounting for variations in the mechanical structure or optical performance of the dish.

To optimize the performance, in terms of power output, of receiver 16, any one of three input sources is integrated to achieve closed loop control. These sources are as follows:

1) Sun Sensor: The sun sensor comprises a pair of optical sensors (not shown) located on either side of a shadow plate. This unit is attached to the array 14 of mirrors 12 such that when the dish 14 is correctly aimed at the sun, each sensor is exposed to the same intensity of sun-light. The outputs of the light intensity sensors are compared and integrated. The feedback loop then attempts to equalize the intensity of the shadows and, as a result, align the dish 14 and therefore receiver 16 to the sun. This mode takes no account of the electrical power generated by the receiver 16, but may be used to account for gross mechanical errors prior to one of the more optimising tracking modes from becoming active.

2) Photovoltaic Array. If the photovoltaic array 18 is receiving useable radiation, the power generated in the top half of the array 18 is compared to the power generated in the bottom half of the array, 18 (in the case of the elevation axis). FIG. 3 is a schematic representation of the photovoltaic cell array 18, comprising sixteen modules 26 in a 4×4 grid, each of which itself comprises an array of cells. Referring to FIGS. 4A and 4B, the power generated in an upper (in this view) set 28a of modules is thus compared to the power generated in a bottom set 28b of modules. The feedback loop attempts to equalize the powers generated and therefore accommodate both physical variations in the dish structure and optical variations resulting in an uneven flux distribution. In practice this mode will maximise the electrical output from the dish.

Referring to FIGS. 4C and 4D, essentially the same process is replicated in the azimuth axis, by comparing the power generated in a left (in this view) or—in the southern hemisphere installation—east set 28c of modules with the power generated in a right (or west) set 28d of modules; the feedback loop then attempts to equalize these generated powers.

3) Thermal Sensors. In the event that the temperature rise on any of the cooled flux modifier plates 22a,b,c,d surrounding the photovoltaic cell array 18 is excessive, the difference in temperature of the top and bottom flux modifier plates 22a and 22b is integrated (in the case of the elevation axis). The feedback loop attempts to equalize these temperatures thereby lowering the thermal stress placed on these flux modifiers. Similarly, the difference in temperature of the left and right flux modifier plates 22c and 22d is integrated in the case of the azimuth axis.

The control system automatically chooses the appropriate mode depending on the need for optimisation of power and safety, that is, the right temperature conditions, solar radiation level and photovoltaic (PV) module power output.

FIGS. 5A and 5B are schematic diagrams of the controllers 30 and 32 respectively of the tracking system, for controlling the dish 14. FIG. 5A shows the elevation axis controller 30, FIG. 5B the azimuth axis controller 32. Except for the calculation of solar position, both axes use identical approaches.

In elevation axis controller 30, the sun's elevation 34 is calculated using a computer program running on a personal computer (PC) or programmable logic controller (PLC). The solar position information is converted to a required number of turns of the elevation drive of the dish 14 taking into account the geometry of the dish structure.

Disregarding the integrator for the present, this position command is applied to a feedback loop that comprises an elevation motor controller 36, an elevation drive motor 38, an elevation feedback encoder 40 and first elevation adder 42. The feedback loop acts to ensure that the difference in elevation between the predicted sun position (and therefore predicted dish position) and actual dish/receiver position 44 relative to the direction of the sun is zero. Thus, the elevation axis to the dish will follow the sun's position as predicted by the PC.

The elevation integrator 46 serves to make small adjustments to calculated solar positions to allow for the mechanical tolerance of the dish structure and any asymmetric behaviour of the optics of the dish 14 or of the receiver 16.

The elevation integrator source is selected by means of an elevation integrator source selector 48. When the source is selected to be "thermal" 50a, the difference between the top and the bottom flux modifier plate temperatures 52 and 54 respectively is integrated 56 over time and applied as an offset to the predicted sun position 34 by second elevation adder 58. This causes the dish to move until the integrated value approaches a 'null', that is, the flux modifier plate temperatures are equalized.

When the integrator source is selected to be "Photovoltaic" (PV) 50b, the sum 60 of the receiver's voltage due to the top half photovoltaic cell array (28a in FIG. 4A) is compared to the sum 62 of the receiver's voltage due to the bottom half of the array (28b in FIG. 4B). The resultant voltage is integrated 64, and the dish's moved in elevation until the receiver's array generates a symmetric voltage. This implies that the power generated in the top half of the receiver 16 is the same as the power generated in the bottom half of the receiver 16. This balance gives the maximum power output.

The sun sensor consists of two light intensity sensors placed on either side of a shadow means in the form of a shadow plate. The shadow plate is aligned to the elevation axis of the dish. When the integrator source is selected to be "sun sensor" 50c, the difference between the top and bottom light intensity outputs 66 and 68 respectively of these sensors is integrated 70. This causes the dish to align itself to the sun.

Elevation integrator source selector 48 also has an off position 50d.

In azimuth axis controller 32, the sun's azimuth 72 is calculated by the same computer program used to calculate elevation 34. The result is converted to the required number of turns of the azimuth drive of the dish 14 taking into account the geometry of the dish structure.

The position command is applied to a feedback loop that comprises an azimuth motor controller 74, an azimuth drive motor 76, an azimuth feedback encoder 78 and first azimuth adder 80. The feedback loop acts to ensure that the difference in azimuth between the predicted sun position (and therefore predicted dish position) and actual dish/receiver position 82 relative to the direction of the sun is zero. Thus, the azimuth axis to the dish will follow the sun's position as predicted by the PC.

The azimuth integrator 84 serves to make small adjustments to calculated solar positions to allow for the mechanical tolerance of the dish structure and any asymmetric behaviour of the optics of the dish 14 or of the receiver 16.

The azimuth integrator source is selected by means of an azimuth integrator source selector 86. (In practice, azimuth integrator source selector 86 and elevation integrator source selector 48 may be combined into a single source selector.) When the source is selected to be "thermal" 88a, the difference between the east and the west flux modifier plate temperatures 90 and 92 respectively is integrated 94 over time and applied as an offset to the predicted sun azimuth 72 by second azimuth adder 96. This causes the dish to move until the integrated value approaches a 'null', that is, the east and west flux modifier plate temperatures are equalized.

When the integrator source is selected to be "Photovoltaic" (PV) 88b, the sum 98 of the receiver's voltage due to the east half of the photovoltaic cell array (28c in FIG. 4C) is compared to the sum 100 of the receiver's voltage due to the west half of the array (28d in FIG. 4D). The resultant voltage is integrated 102, and the dish's moved in azimuth until the receiver's array generates a symmetric voltage. This implies that the power generated in the east half of the receiver 16 is the same as the power generated in the west half of the receiver 16. This balance gives the maximum power output.

The azimuth sun sensor consists of two light intensity sensors placed on either side of a shadow means in the form of a shadow plate. The shadow plate is aligned to the azimuth axis of the dish. When the integrator source is selected to be "sun sensor" 88c, the difference between the east and west light intensity outputs 104 and 106 respectively of these sensors is integrated 108. This causes the dish to align itself to the sun.

Azimuth integrator source selector 86 also has an "off" position 88d.

Referring to FIGS. 5A and 5B, the selection of integrator source is based on the following criteria. If the temperature on any of the flux modifier plates 22a,b,c,d exceeds a prescribed limit (typically 60° C.), or there is low electrical power being generated (below a preset threshold limit) whilst the flux modifier plates are, say, 5° C. higher than the coolant temperature, thermal mode is selected and the control algorithm instructs the dish to move the dish based on the flux modifier plate temperatures. As mentioned above, the selection of the mode and the switching thereto is performed automatically by the control system, which chooses the appropriate mode depending on the circumstances.

If the temperature on any of the flux modifier plates 22a,b,c,d does not exceed the prescribed limit and the receiver 16 is generating electrical power above a preset limit, PV mode is selected and the control algorithm instructs the dish to move the dish 14 based on the receiver PV module electrical output.

If neither of the above conditions exists but a sufficient signal is available from the sun sensor, the sun sensor mode is selected. This will align the dish/receiver to the sun, but will not account for any asymmetry effecting the output of the receiver 16.

If there is low electrical power being generated (below a preset limit) the temperature on all of the flux modifier plates 22a,b,c,d is less than, say, 5° C. above the coolant temperature, and there is insufficient light intensity for the sun sensor to work, the integrator source will be zero. Therefore, the integrator will maintain its previous value from the PC/PLC and the dish is moved according to the change in predicted values.

Modifications within the spirit and scope of the invention may readily be effected by persons skilled in the art. It is to be understood, therefore, that this invention is not limited to the particular embodiments described by way of example hereinabove.

For the purpose of this specification the words "comprising", "comprise" or "comprises" are understood to mean the inclusion of a feature but not necessarily exclusion of any other feature.

It is to be understood that, if any prior art is referred to herein, such reference does not constitute an admission that that prior art forms a part of the common general knowledge in the art, in Australia or in any other country.

The invention claimed is:

1. A solar tracking system for controlling the alignment of a solar power generator with respect to the sun, said generator having a solar radiation receiver comprising an array of power generating photovoltaic cells for converting solar radiation into electric current and a solar radiation collector for collecting solar radiation and directing said radiation towards said receiver, said system comprising:

a comparison mechanism for receiving and comparing a first signal from a first cell of said photovoltaic cells, the first signal being indicative of exposure of said first cell to solar radiation from said collector and a second signal from a second cell of said photovoltaic cells the second signal being indicative of exposure of said second cell to solar radiation from said collector and for producing at least one comparison signal therefrom; and control mechanism for controlling said alignment according to said comparison signal;

wherein said first cell and said second cell both contribute to the power output of said solar power generator and provide sianals for the alignment of said solar power generator.

2. A system as claimed in claim 1, wherein one or more additional cells of said photovoltaic cells are arranged to output respective additional signals according to their respective exposure to solar radiation from said collector, and said comparison mechanism produces said comparison signal based on said first, second and additional sianals.

3. A system as claimed in claim 2, wherein said first, second and additional cells are arranged in a plurality of grids within said array of photovoltaic cells.

4. A system as claimed in claim 1, wherein said collector includes auxiliary mirrors provided to direct solar radiation towards said first and second cells.

5. A system as claimed in claim 1, wherein said receiver further includes at least first and second thermal detectors with thermal output signals indicative of the heating of said respective thermal detectors when exposed to said solar radiation, wherein said thermal detectors are at respective locations at the receiver periphery to be exposed to a portion of said solar radiation from said collector during normal operation of said generator and for providing a measure of the alignment of said solar radiation relative to said receiver, wherein said control mechanism is arranged to receive said thermal output signals, to determine a temperature difference therefrom and to control said alignment to impose a maximum acceptable temperature difference, and to provide tracking on the basis of said thermal output signals in the event of partial or total failure of the tracking control provided by said first and second cells.

6. A system as claimed in claim 1, wherein said comparison mechanism is operable to control said alignment to maximize the sum of said output signals.

7. A system as claimed in claim 1, including a solar position predictor, for predicting the position of the sun on the basis of either a look-up table of solar positions or a solar position algorithm, and said control mechanism is operable to employ said predicted position in controlling said alignment of said generator.

8. A system as claimed in claim 1, wherein said system is operable to control said alignment to maximize said electric current.

9. A method of solar tracking for controlling the alignment of a solar power generator with respect to the sun, said generator having a solar radiation receiver comprising an array of power generating photovoltaic cells for converting solar radiation into electric current and a solar radiation collector for collecting solar radiation and directing said radiation towards said receiver, said method comprising:

comparing a first signal from a first cell of photovoltaic cells, the first signal being indicative of exposure of said first cell to solar radiation from said collector and a second signal from a second cell of said photovoltaic cells, the second signal being indicative of exposure of said second cell to solar radiation from said collector, and producing at least one comparison signal therefrom; and controlling said alignment according to said comparison signal;

wherein said first cell and said second cell both contribute to the power output of said solar power generator and provide signals for the alignment of said solar power generator.

10. A method as claimed in claim 9, including predicting the position of the sun on the basis of either a look-up table of solar positions or a solar position algorithm, and employing said predicted position in controlling said alignment of said generator.

11. A method as claimed in claim 9, further comprising outputting, from one or more additional cells of said photovoltaic cells, respective additional signals according to the respective exposure of said additional cells to solar radiation from said collector, and producing said comparison signal based on said first, second and additional signals.

12. A method as claimed in claim 11, including arranging said first, second and additional cells in a plurality of grids within said array of photovoltaic cells.

* * * * *

UNITED STATES PATENT AND TRADEMARK OFFICE
CERTIFICATE OF CORRECTION

| | |
|---|---|
| PATENT NO. | : 7,109,461 B2 |
| APPLICATION NO. | : 10/472978 |
| DATED | : September 19, 2006 |
| INVENTOR(S) | : Lasich |

Page 1 of 1

It is certified that error appears in the above-identified patent and that said Letters Patent is hereby corrected as shown below:

Title Page; item (56);

In the References Cited – Foreign Patent Documents:

Column 2, page 2, "WO 97/57493" should read --WO 99/57493--

Should also include --WO 97/49956 12/1997--

In the References Cited – Other Publications:

Should also include --International Preliminary Examination Report of PCT Application No. PCT/AU02/00401--

In the Specification:

Column 1, line 39, "thug" should read --thus--

Column 2, line 7, "looses" should read --losses--

Column 3, line 37, "equation (s)" should read --equation(s)--

Signed and Sealed this

Twentieth Day of April, 2010

David J. Kappos
*Director of the United States Patent and Trademark Office*